United States Patent [19]

Cerny

[11] Patent Number: 4,483,891

[45] Date of Patent: Nov. 20, 1984

[54] MULTILAYERED TUBE HAVING A BARRIER LAYER

[75] Inventor: Daryl D. Cerny, Greenville, Ohio

[73] Assignee: Ball Corporation, Muncie, Ind.

[21] Appl. No.: 539,495

[22] Filed: Oct. 6, 1983

Related U.S. Application Data

[62] Division of Ser. No. 329,625, Dec. 11, 1981, Pat. No. 4,424,182.

[51] Int. Cl.³ .............................................. B65D 23/00
[52] U.S. Cl. .................................... 428/35; 428/542.8
[58] Field of Search .............................. 428/35, 542.8

[56] References Cited

U.S. PATENT DOCUMENTS

| | | | |
|---|---|---|---|
| 3,308,508 | 3/1967 | Schrenk | 18/14 |
| 3,354,506 | 11/1967 | Raley | 18/14 |
| 3,430,290 | 3/1969 | Kinslow, Jr. | 425/325 |
| 3,457,337 | 7/1969 | Turner | 264/98 |
| 3,509,252 | 4/1970 | Baehr | 264/296 |
| 3,686,379 | 8/1972 | Gilbert | 264/89 |
| 3,892,828 | 7/1975 | Weatherly et al. | 264/89 |
| 3,955,697 | 5/1976 | Valyi | 215/1 C |
| 4,079,850 | 3/1978 | Suzuki et al. | 215/1 C |

Primary Examiner—John E. Kittle
Attorney, Agent, or Firm—G. E. Alberding

[57] ABSTRACT

A method is disclosed for sealing or closing off the open end of a multilayered tubular structure, especially one having a barrier or low-gas permeable layer, whereby the integrity of said barrier layer is maintained. The method gives rise to a multilayered parison structure which comprises a cylindrical body having a body wall, an open portion terminating at one end thereof and a bottom wall at the opposite end of said body, said body and bottom walls being composed of a plurality of layers bonded together, all the layers of said bottom wall extending fully inwardly in contacting and overlapping relationship with like layers along the longitudinal axis of said cylindrical body, and a balancing member attached to said bottom wall, said member being composed of a single layer material forced therefrom while in a plastic state.

4 Claims, 11 Drawing Figures

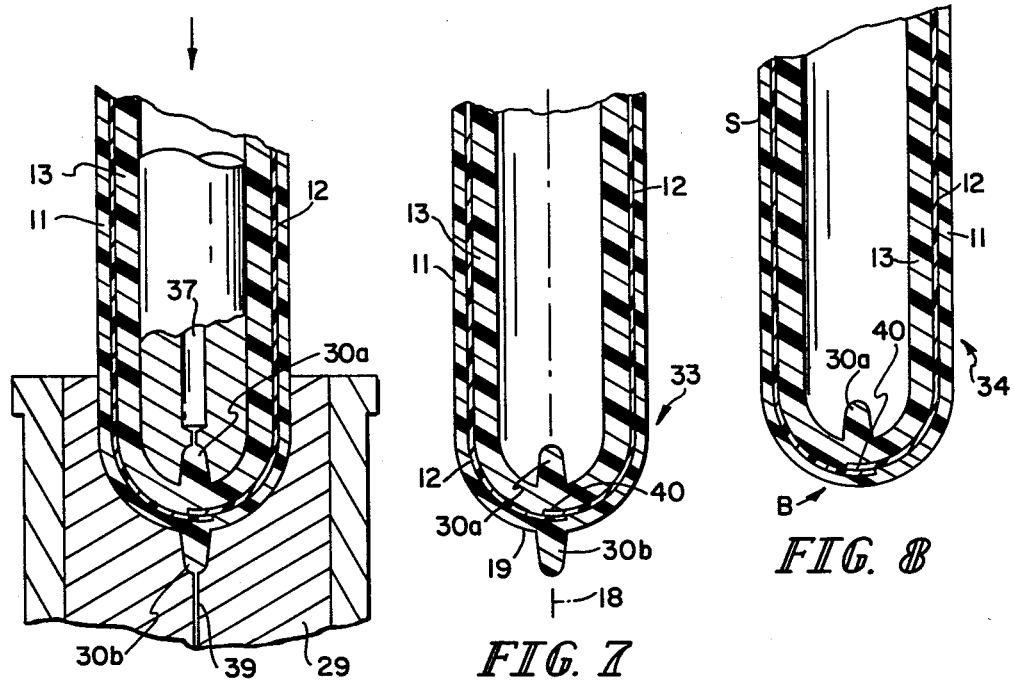
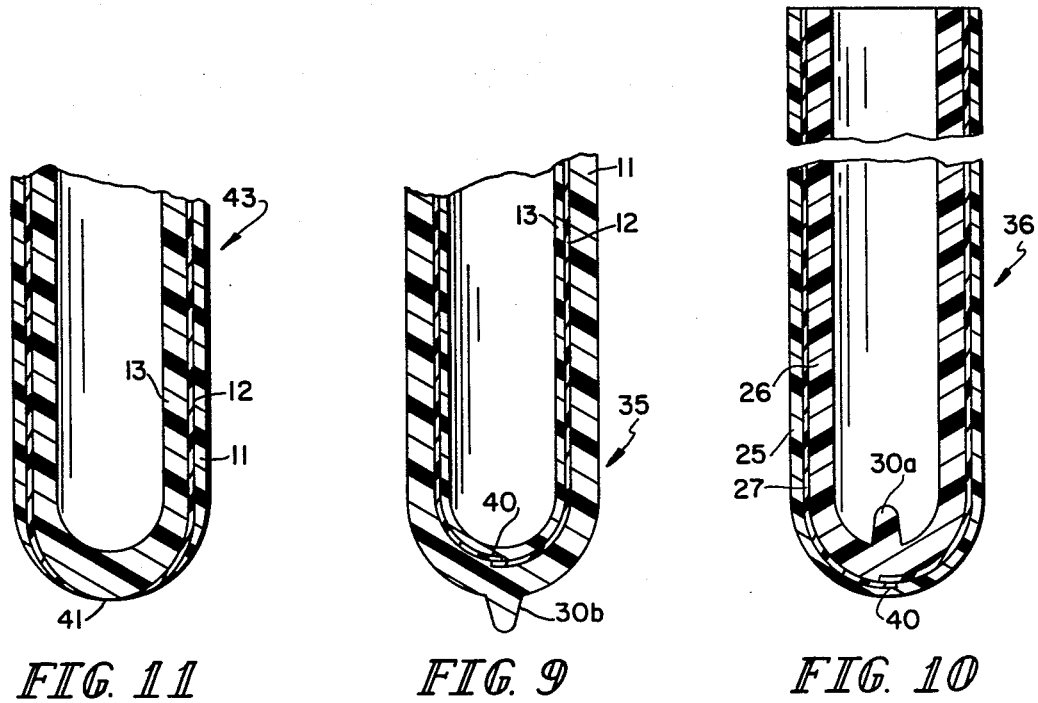

MULTILAYERED TUBE HAVING A BARRIER LAYER

This is a division of application Ser. No. 329,625, filed Dec. 11, 1981 now U.S. Pat. No. 4,424,182.

BACKGROUND OF THE INVENTION

This invention relates to polymeric bodies having a multilayered structure, and more particularly relates to multilayered thermoplastic tubular parisons formed by sealing off lengths of tubing, the tubing being prepared by coextrusions techniques having a low-gas permeable layer situated over substantially the entire area thereof. Moreover, the subject invention relates to a method for closing or sealing an open end of multilayered tube bodies having inner and outer thermoplastic layers with a barrier layer therebetween, the sealing being done to assure the integrity of the barrier layer over the full extent of the sealed off portions.

The formation of multilayered structures is known wherein the separate layers contribute in some degree to the final properties. Many types of multilayered structures can be prepared by melting each individual component in a separate zone and subsequently combining them in a predetermined configuration. In general, multilayered structures of two or more different polymeric materials may be readily coextruded or cojoined to form varied shaped multilayered structures. In particular, multilayered structures of a tubular or cylindrical configuration may be readily made by conventional coextrusion processes wherein each thermoplastic material which ultimately forms a layer in the multilayered structure is separately heated to its respective melt-extrusion temperature by a conventional melt extruder and, thereafter, each melted material is forced by pressure-feeding means into streams of melted thermoplastic material that enter a multimanifold die device provided with toroidal chambers and a common annular die orifice. The melted materials are fed at the same time into said device and form therein continuous annular layers as they exit the die orifice, each additional layer being fed to the device and issuing as annular coaxial layers that are essentially concentric with the initially formed annular layer. In essence, the device provides an annular flow of plastic materials, one strata of thermoplastic material being circumferentially deposited upon the preceding one to produce the multilayered tubular body. After being formed and subsequently cooled, the tubular body in the form of continuous tubing is cut into predetermined lengths or parisons blanks that are in effect cylindrical multilayered structure having two open ends. In attempting to seal or close off an open end of a multilayered structure, especially structures having at least one low-gas permeable layer therein, it is soon realized that it is most difficult to properly seal the open end portion and still maintain the integrity of the low-gas permeable layer. Generally there is little problem in completely sealing or closing off a monolithic tubular structure, that is, a structure containing only one polymeric material. In such a situation the portion to be sealed or closed off is merely heated and the sidewalls are forced together into sealing contact by means of coacting bearing elements. This may be readily accomplished by simply pinching off and cross-bonding a fusible thermoplastic material, usually along a longitudinal plane. In such a situation the plastic material readily bonds or adheres to itself. It is readily apparent that when the tubular body comprises a multilayered structure wherein certain layers possess certain desired properties that must be evenly distributed throughout the total area there is realized a number of problems that manifest themselves in attempting to simply form and close one end of such a structure. Since there are often a number of different or diverse polymeric materials that are cojoined in the tubular structure, there is a marked tendency during any heating and subsequent severing or cutting of these layers of cojoined materials to constrict or shrink at different rates during the cooling thereof whereby an uneven tubular structure often results. Moreover, since some of the polymeric materials making up the structure have different physical properties such as being less viscous and workable than other plastics at a given temperature, different polymeric materials offer various degrees of formability and resistance and are more difficult to manipulate subsequently in a reforming process within the composite structure. The property of formability is particularly noticeable with barrier or low-gas permeable materials since these materials generally have higher melting points, different backing arrangements within their molecular lattices, greater bond strengths between adjacent molecules and other properties which all play a role in making them more difficult to work and to reform when compared to other thermoplastic materials.

Where low-gas permeable layers are incorporated as a layer or layers in tubular structures there is a marked improvement in achieving uniformity of such a layer or layers throughout all areas of a fabricated tube in following the teachings of this invention. This is of particular importance in the early stage of the tube design and does not matter whether such tube be in a parison form or in a final container form. The subject method offers a process of sealing or completely closing off an open end of a multilayered tube having inner and outer thermoplastic layers with a low-gas permeable layer therebetween whereby the latter layer is assured of its integrity throughout the tube, especially the closed end or basal portion thereof. Furthermore, the subject invention provides a method of utilizing multilayered tubular structures having low-gas permeability as well as containers formed from said tubular structures and bringing about bottom wall sealability which, in turn, enables said structures to be useful for many purposes in the art, especially for parisons in blow molding containers as hereinafter set forth.

Although the particular problems resolved by the subject invention have not been appreciated or squarely addressed by the prior art, there are assuredly related and pertinent patents in this field. As a brief overview, a number of patents disclose methods of making tubular, multilayered structures as well as methods of blow molding certain thermoplastic structures. For example, the method of coextruding multilayered tubular bodies is described in U.S. Pat. No. 3,308,508 to Schrenk as well as U.S. Pat. No. 3,354,506 to Raley. A method for the sealing and severing of parisons is disclosed in U.S. Pat. No. 3,430,290 to Kinslow, Jr., as well as U.S. Pat. No. 3,686,379 to Gilbert. Lastly, U.S. Pat. No. 3,955,697 to Valyi describes a method of making a multilayered, hollow plastic container employing injection molding techniques.

SUMMARY OF THE INVENTION

It is an object of this invention to provide a method of closing off an open end of a multilayered tube, said tube being made of at least two diverse polymers wherein one is a low-gas permeable layer whereby said layer maintains its integrity throughout its surface, especially across the bottom portion of said closed tube.

It is another object of this invention to provide a method for converging the sidewalls of a multilayered tubular body, to converge and unite the same in an even and uniform dome-like or rounded configuration.

It is yet another object of this invention to provide a composition parison structure having excellent mechanical properties that may be readily used in conventional blow molding operation to make containers and the like.

Still another object of this invention is to provide a tubular parison structure having at least one barrier layer that is uniformly distributed throughout the structure, maintaining said barrier layer an overlapping or contacting relationship over the basal portion of said parison structure.

It is yet another object to provide an improved parison for subsequent blow molding into hollow objects, the objects having good barrier properties throughout the entire container.

It is yet another object of this invention to provide a process for making a tubular parison capable of allowing the manufacturer of various types of containers having enhanced properties, including particularly low-gas permeability throughout the container, especially their bottom wall configuration.

It is still another object to provide a process of converging a plurality of diverse polymeric layers at one end of a cylindrical body into a closed and rounded configuration whereby each layer is uniformly brought into alignment and proper placement with itself.

Other objects, advantages and features of this invention will be apparent to those skilled in the art from the drawings and disclosure herein.

In one aspect of the subject invention there is provided a method of closing off an open end of a multilayered tube having inner and outer thermoplastic layers with a barrier layer therebetween to assure the integrity of the latter layer, which comprises heating the open end of the tube to an essentially plastic state, deforming inwardly while supporting the inner surface of the heated tube to define a shoulder thereby converging the outer thermoplastic and barrier layers and bringing together to unite the inner thermoplastic layer into a stem-like protrusion therefrom, forging the previously defined shoulder and protrusion while allowing a predetermined quantity of thermoplastic material to exit therefrom whereby said barrier layer is juxtaposed or substantially aligned within the forged end portion of the tube thereby assuring the integrity of said barrier layer.

In another aspect of the present invention, briefly summarized, there is provided a method of closing off an open end of a multilayered tube having inner and outer thermoplastic layers with a barrier layer therebetween to assure the integrity of the latter layer, which comprises inwardly deflecting an end of the tube while supporting its inner surface to draw together said thermoplastic layers, uniting the inner thermoplastic layer and closing off the open end by forming a stem-like protrusion therefrom wherein the barrier layer assumes a closed curve configuration, severing a portion near the end of said protrusion whereby a portion of the protrusion is severed and the closed curved of barrier layer is drawn still closer together, and forging the severed protrusion of the tube while allowing a predetermined quantity of thermoplastic material to exit therefrom whereby the barrier layer is brought into substantial alignment thereby maintaining the integrity of the barrier layer over the closed off end of the multilayered tube.

In another aspect of the subject invention there is provided a multilayered parison structure comprising a cylindrical body having a body wall, an open portion terminating at one end thereof and a bottom wall at the opposite end of said body, said body and bottom walls being composed of a plurality of layers bonded together, all the layers of said bottom wall extending fully inwardly in contacting and overlapping relationship with like layers about the longitudinal axis of said tubular body, and a balancing member attached to said bottom wall, said member being composed of a single layer material forged therefrom while in a plastic state.

The nature, principal, utility and further features of this invention will be apparent from the following detailed description including specific examples of practice illustrating preferred embodiments of the subject invention.

BRIEF DESCRIPTION OF THE DRAWINGS

In the drawings:

FIG. 6 is a view of the forging station showing in cross section a preferred embodiment for the venting means used to properly position a low-gas permeable layer therein;

FIG. 7 shows a cross-sectional view of a parison after it is formed in accordance with this invention;

FIG. 8 shows yet another embodiment of the parison formed in accordance with this invention;

FIG. 9 illustrates still another embodiment of the subject invention showing the low-gas permeable layer situated proximate the interior of the parison;

FIG. 10 shows a complete parison having two different thermoplastic inner and outer layers sandwiched between a low-gas permeable layer; and FIG. 11 shows a parison which may be formed without the process of the subject invention.

DESCRIPTION OF THE PREFERRED EMBODIMENT

Figure 1:
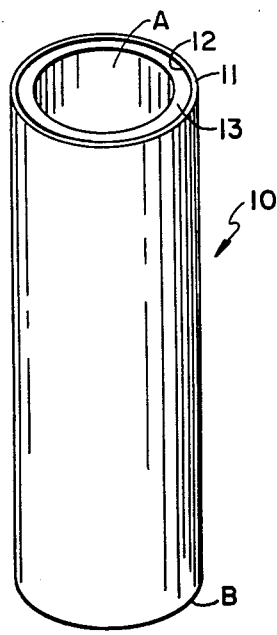
FIG. 1 is a perspective view of the tubular body of this invention.

Turning first to FIG. 1 a sectional view of a tubular thermoplastic body is shown, the body itself being designated generally by reference number 10. The body 10 comprises a first or outer polymeric material 11 bonded to a low-gas permeable layer 12 which in turn is bonded to an inner polymeric material 13. The low-gas permeable layer 12 is secured to the inner and outer layers, viz., 11 and 12, by a very thin coupling or adhesive material 14 which is used to secure the polymeric layers and serves to maintain the surfaces together whereby no air or gaseous material may be entrapped therebetween. It can be seen that the body 10 is a discrete unit, having been severed from a larger coextruded tubing material, and is provided with two openings therein, one in the top portion A and the other in the bottom or lower portion B. It will be readily appreciated that the top opening A may be reformed in subsequent steps to form the finish or open-mouth portion of a given parison or container whereas the bottom portion B can be reformed and reshaped into a basal portion for said parison or container.

Figure 2:
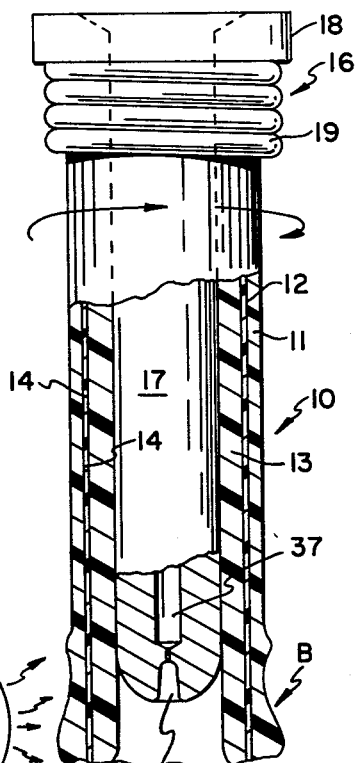
FIG. 2 illustrates a cross-sectional view of the tubular structure as it is being heated along one end thereof.
Figure 5:
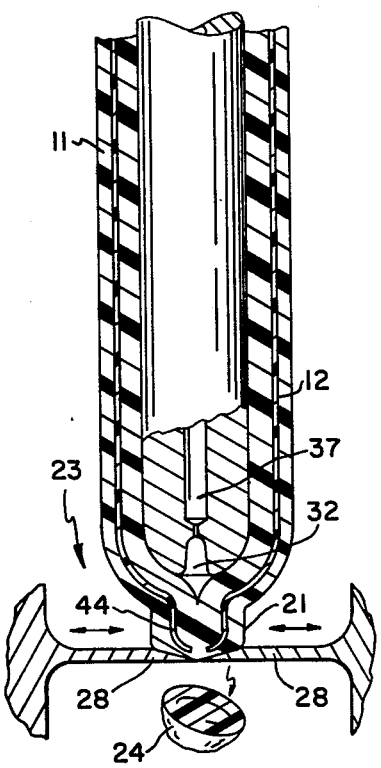
FIG. 5 illustrates a cross-sectional view of a formed parison having its stem severed by cutting means.
Figure 3:
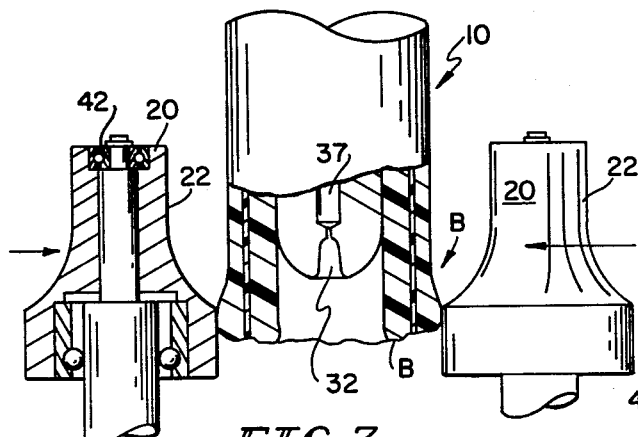
FIG. 3 is a cross-sectional view of the converging means approaching the heated end of the thermoplastic tube.
Figure 4:
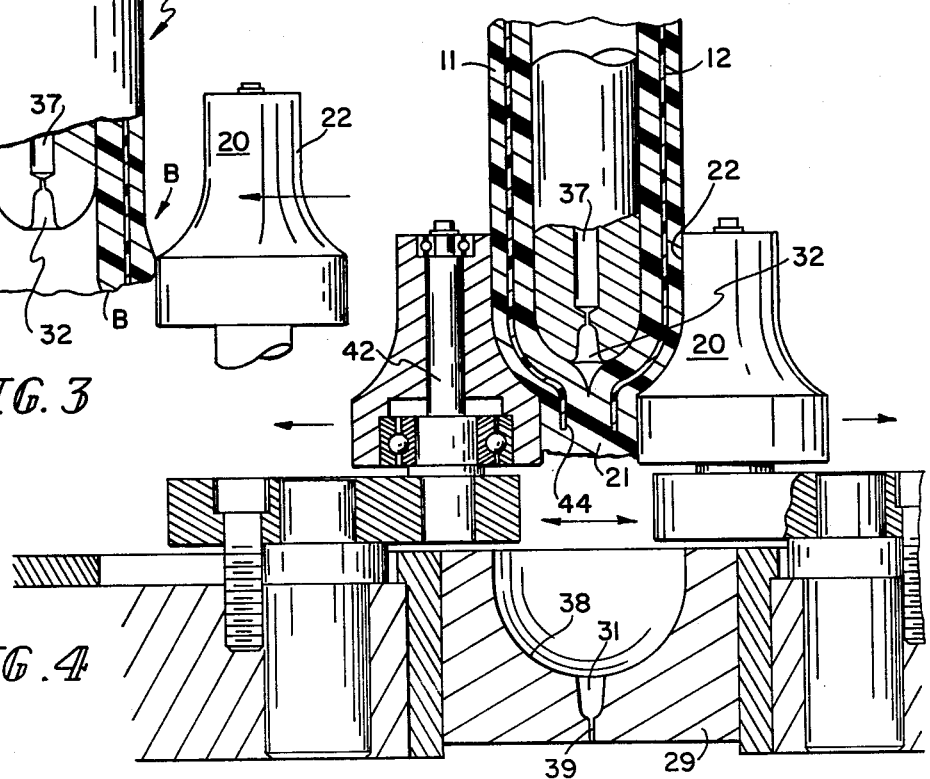
FIG. 4 illustrates a fragmentary cross section of the converging and forging devices herein described.

As best shown in FIG. 2, the lower end B of the tube 10 can to be closed or sealed off is first brought to a plastic or semiplastic state by exposing the end B to heating means 15. For this heating step, it will be noted that tube or body 10 is conveniently held in position by a locking device, generally designated by reference numeral 16. In positioning the tube 10, the tube is brought over a mandrel 17 which snugly retains tube 10 thereon whereby the open-end portion at A is brought into contact with plate 18 and engaging spring 19 receives the tube and engages and grips the same. From FIG. 2 it will be noted that a part of the tube at portion B stands free of the mandrel 17 and heat from the heating means 15 is directed thereon while said tube 10 is rotated about its axis. Thus, the portion B of tube is heated to a plastic or semiplastic state whereby it slightly expands to some degree and made ready to be worked or molded. The heated portion B is immediately brought into contact with curved bearing surfaces 22 of capstans or molding means 20 which converge inwardly on portion B as best shown in FIGS. 3 and 4. In effect, portion B is immediately contoured or shaped in such a fashion that the peripheral wall portion is drawn inwardly and contacts and unites with inner surface 13 bonding the same to itself whereby an extended protrusion or stem 21 is formed. It will be appreciated that the portion B is molded to conform to the bearing surfaces 22 of the molding means 20 by allowing the molding means 20 to converge directly upon the portion B while in a plastic state whereby the portion B is uniformly brought inwardly and the low-gas permeable layer 12 is brought together to define an annular portion 44 concentric with the stem 21. It will be observed that the low-gas permeable layer 12 is not brought into a position of contact with itself as viewed in the cross section of FIG. 4 but is necked inwardly in a more or less cylindrically shaped stem 21 of substantially reduced diameter in which annular portion 44 is formed. In a preferred embodiment the low-gas permeable layer 12 as it extends in the stem portion 21 of the tube is further brought together to almost a contacting relationship by a shearing action as illustrated in FIG. 5 where shearing means 23 comprising cutting knives 28 converge on the peripheral portion of the stem 21 and slice a small section 24 therefrom. In this embodiment, it appears that the shear action of the knife blades 28 aid in further bringing the layer 12 inwardly. Seemingly, as the blades or knives converge they contact the outer stem portion which has developed a thin crust-like outer layer of substantially hard material beneath which is softer or more pliable thermoplastic material with the result that the harder outer layer impinges and constricts the softer material bringing the barrier layer almost into a contacting relationship with itself. After cutting, the severed stem portion 21 is immediately brought downwardly as best shown in FIG. 6 and into a forging die 29 where the reformed portion B including the stem portion 21 is forced therein and against die surface 38 by the downward thrust of the tightly held tube 10. The plastic state of the inner and outer thermoplastic materials is such that they at once exit outwardly, and fill the opening 31 and 32 whereby the material is forced therein and when removed from the forging die 29 results in the formation of balancing members 30a and 30b. These balancing members, 30a and 30b, are important in allowing the material during the forging operation to partially exit therefrom to thereby allow a small yet predetermined amount of plastic material to vent in such a fashion as to cause the low-gas permeable layer 12 to properly align and place itself at a uniform distance from the outer surface of the parison. It should be appreciated that in the absence of such exiting means or opening 31 and 32 there would be uneven placement of the layer 12 around the closed end. FIG. 11 depicts a tube having a low-gas permeable layer 12 which has been formed without venting as herein set forth with the result that the layer 12 does not make adequate contact along the basal portion B and thus leaves a substantial portion without such layer 12. In effect the low-gas layer does not close and leaves a barrier free portion 41. Aside from not closing, the layer 12 may outcrop along the basal portion and be exposed therein along the surface. This also renders a defective parison as well as one of poor physical appearance.

FIGS. 7, 8 and 9 show preferred parison formed in accordance with this invention. The closed-off portion of the bottom B of the parison 33 is drawn and curved inwardly to define layers that slope toward the longitudinal axis 18, the layers maintaining their integrity, that is, the layers retain good bonding strength along the curved layers throughout the entire bottom wall, are coextrusive therewith, and maintain approximately a preceptable distance from the outer surface. FIG. 7 illustrates a cross section of another basal portion or bottom wall 19 of a parison 33 showing a combined internal and external member, 30a and 30b, said members being coaxially with one another. It will be seen that the low-gas permeable layer 12 is positioned in the basal portion 19 of the parison proximate the outer surface of the bottom wall 19 yet is spaced therefrom. Further, FIG. 8 depicts a parison 34 having a single balancing member, an internal member 30a whereas FIG. 9 depicts another parison structure 35 having only an external balancing member 30b. FIG. 10 depicts a parison having two different or diverse thermoplastic materials for the inner layer 26 and outer layer 25.

A wide range of thermoplastic materials, and preferably orientable materials, may be used for the polymeric layers, that is, for those polymeric layers other than the at least one barrier layer of low gas permeability. In particular, the thermoplastic materials include the solid polyolefins such as polyethylene, polypropylene and polybutylene. The polyolefins herein contemplated include polyethylene, polypropylene, resinous copolymers of ethylene and propylene and polymers of ethylene and/or propylene with minor proportions of olefinically unsaturated monomers such as the low molecular weight olefins having, for example, from 2 to 8 carbon atoms such as 1-butene, 1-pentene, 1-hexene, 1-heptene, and 1-octene. Other hydrocarbons useful for the copolymers herein are the copolymers of ethylene and propylene include divinylbenzene, allene, dimethallyl and isopentene. Also included in the thermoplastic materials for the layers that are not the barrier layer are polystyrene, polymethacrylates including polymethyl methacrylate and polybutyl methacrylate; polyvinyl alcohols; polyvinyl halides; polyvinyl acetals including polyvinyl trityral, polyallyl alcohol and polyallyl acetate; polyesters including polyethylene terephthalate and polycarbornates.

The term low gas permeable layer or barrier layer as used herein include polyvinylidene chloride and its copolymers; polyacrylonitrite and its copolymers including poly(acrylonitrile-co-styrene-co-butadiene); polyamides such as nylon; and hydrolized polymers of vinyl acetate and ethylene, especially saponified copolymers thereof. In general, the term polyvinylidene chloride copolymers as used herein mean a polymeric material which contains at least 50 percent of vinylidene chloride. A preferred barrier layer in accordance with this invention is polyvinylidene chloride and its copolymers. Copolymerizable monomers with vinylidene chloride include vinyl chloride, butadiene, acrylonitrile, vinyl acetate, methyl acrylate, ethyl acrylate, butyl acrylate, and methyl methacrylate. Terpolymers can also be employed, e.g., a terpolymer of vinylidene chloride, methyl methacrylate and vinyl chloride.

A relatively wide range of polymers and polymeric compositions are useful to increase the adhesion between the various thermoplastic layers as well as between the thermoplastic layers and the barrier layer. In making the tubular structures herein contemplated it is found most desirable to add adhesive or bonding layers between the barrier layer and the other thermoplastic layers. This has many advantages including the prevention of entrapping air in the coextruded material. In selecting adhering materials to serve as glue with respect to bonding polypropylene to vinylidene chloride polymers, a number of compositions may be used; compositions which are particularly advantageous are copolymers containing about 13 weight percent to about 35 weight percent vinyl acetate with from about 87 weight percent to about 65 weight percent ethylene, copolymer compositions of from about 20 to 30 weight percent ethyl acrylate with from about 80 to 70 weight percent ethylene, copolymer compositions from about 20 to 30 weight percent isobutyl acrylate with from about 80 to 70 weight percent of ethylene and chlorinated polyethylene containing from about 25 to 40 weight percent chlorine and copolymers of butadiene-styrene. Suitable polymers or polymeric compositions may be readily selected by determining the bonding strength of the particular layer combination, usually by using peel strength tests.

It is important to realize that the tubular structure to be closed off has a rigid or substantially rigid zone and a plastic or substantially plastic zone. Thus, in viewing FIG. 8, for example, the portion B is in a more or less plastic state as compared to upper sidewall portion S which is substantially more rigid and less formable. For all practical purposes the layers making up portion S remain intact and are not disturbed in sealing off the bottom end of the structure and it is the layers that are pliable and formable within the portion B that have to be properly aligned. The first initial measure of alignment may be done by severing the stem portion as above described to bring the layer 12 closer together and thereafter forcing the cut portion into the forging die supplied with at least one opening or existing means therein for venting at least one outer layer such as layers 11 or 13. The opening 31 or 32 in the forging die allows a small flow of the thermoplastic material to be vented, the amount of which being dependent upon the initial position of the barrier layer itself from the outer surface wall, that is whether the layer is situated proximate the outer or inner surfaces of the structure. In general, when the barrier layer is situated proximate the outer surface as shown for example in FIG. 7, the location of the opening 32 to form member 30a is important in that upon impact of the structure the thermoplastic material of layer 13 vents upwardly and pulls slightly layer 12 therewith to move and position it properly within parison 33 as shown. On the other hand, when barrier layer 12 is proximate the inner surface as shown on FIG. 9 an opening is provided on the bottom surface whereby upon impact of the structure the outer layer 11 is forced downwardly and pulls therewith layer 12, pulling it away slightly from the surface and aligning it properly as shown in FIG. 9 of the completed end portion of the parison 35.

The member 30 serves to balance the barrier layer so that it does not surface itself on either the inside or outside of the bottom wall. In effect, the member 30 is placed on that surface to which the barrier layer is to be gently urged and finally positioned in the parison. To a limited degree, the volume of the opening determines the amount of displacement, smaller volumes resulting in small displacements and larger volumes resulting in larger displacements. Having served its function, the member 30 may be easily removed as by cutting or merely fattening to conform to the basal portion of the bottom wall.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A multilayered parison structure comprising a cylindrical body having a body wall, an open portion terminating at one end thereof and a bottom wall at the opposite end of said body, said body and bottom walls being composed of a plurlity of layers bonded together, all the layers of said bottom wall extending fully inwardly in contacting relationship with like layers about the longitudinal axis of said cylindrical body, one of said plurality of layers being a low-gas permeable layer, said low-gas permeable layer being in an overlapping relationship, and at least one balancing member attached to said bottom wall, said member being composed of a single layer material forced therefrom while in a plastic state, said member being forced by venting upon impact to exit a predetermined volume of said material about the longitudinal axis to define an annular protrusion.

2. The structure of claim 1 wherein the, at least one, balancing member is external of the cylindrical body.

3. The structure of claim 1 wherein the, at least one, balancing member is internal of the cylindrical body.

4. The structure of claim 1 wherein the balancing member is both internal and external of the cylindrical body.

* * * * *